United States Patent [19]

Bier et al.

[11] 4,163,100

[45] Jul. 31, 1979

[54] RAPIDLY CRYSTALLIZING POLYESTER COMPOSITIONS

[75] Inventors: Peter Bier; Rudolf Binsack, both of Krefeld, Fed. Rep. of Germany

[73] Assignee: Bayer Aktiengesellschaft, Leverkusen, Fed. Rep. of Germany

[21] Appl. No.: 889,710

[22] Filed: Mar. 24, 1978

Related U.S. Application Data

[63] Continuation-in-part of Ser. No. 828,453, Aug. 29, 1977, abandoned.

[30] Foreign Application Priority Data

Sep. 2, 1976 [DE] Fed. Rep. of Germany ....... 2639428

[51] Int. Cl.$^2$ .................. C08G 63/70; C08G 63/76
[52] U.S. Cl. ........................ 525/3; 260/40 R; 260/40 P; 528/173; 528/175
[58] Field of Search .............. 260/47 C, 49, 75 S, 260/40 R, 75 T, 40 P; 528/173, 175, 273

[56] References Cited

U.S. PATENT DOCUMENTS

| | | | |
|---|---|---|---|
| 3,313,778 | 4/1967 | Sakurai et al. | 260/49 |
| 3,583,941 | 6/1971 | Trapasso et al. | 260/75 |
| 3,663,508 | 5/1972 | Mobius et al. | 260/49 |

Primary Examiner—Lester L. Lee
Attorney, Agent, or Firm—Gene Harsh; Lawrence S. Pope

[57] ABSTRACT

The present invention is concerned with polyalkylene terephthalate molding compositions which have improved crystallization behavior as a result of blending with selected sulphonic acid esters. The addition of an effective amount of these esters, generally between about 0.5 to 30 wt. %, improves the rate of crystallization of polyalkylene terephthalates such as polyethylene terephthalate thus permitting the use of shorter mold residence and lower mold temperatures in injection molding.

The invention is also concerned with a process for improving the crystallization behavior of polyalkylene terephthalates by melt blending them with selected sulphonic acid esters.

6 Claims, No Drawings

RAPIDLY CRYSTALLIZING POLYESTER COMPOSITIONS

This application is a continuation-in-part of our co-pending application Ser. No. 828,453 filed Aug. 29, 1977 and now abandoned.

FIELD OF THE INVENTION

This invention relates to highly crystalline, rapidly crystallizing thermoplastic compositions comprising a high molecular weight polyalkylene terephthalate and a sulphonic acid ester.

BACKGROUND OF THE INVENTION

Polyalkylene terephthalates have acquired considerable significance as starting materials for the production of fibers, films and shaped articles. By virtue of their partially crystalline structure, they show outstanding properties, for example, high wear resistance, favorable creep rupture strength and high dimensional stability, and are therefore particularly suitable for the production of shaped articles subjected to heavy mechanical and thermal stressing. An additional improvement in their mechanical properties can be obtained by the incorporation of reinforcing materials, for example glass fibers (U.K. patent specification No. 1,111,012, U.S. Pat. No. 3,368,955, German Auslegeschrift No. 2,042,447).

By virtue of its special physical properties, polyethylene terephthalate (PET) is particularly suitable for the production of fiber products and films, but is scarcely suitable for injection-molding because high mold temperatures (about 140° C.) and relatively long molding times are required for this purpose. This serious disadvantage almost completely prevents the use of polyethylene terephthalate for injection-molding despite its high rigidity and thermal stability.

Although polypropylene terephthalate (PPT) and polybutylene terephthalate (PBT) require shorter molding times and lower mold temperatures (about 100° C.) by virtue of their higher crystallization rate, they show poorer physical properties, in particular less thermal stability than polyethylene terephthalate.

It has also been tried to produce polycondensates which combine the favorable properties both of polyethylene terephthalate and of polypropylene or polybutylene terephthalate. For example, it is known that the tendency towards crystallization of polyethylene terephthalate can be improved by nucleation with finely divided, solid inorganic materials (Netherlands patent specification No. 6,511,744).

High crystallinity guarantees hardness and dimensional stability, even at elevated temperatures. This high crystallinity should be reached as quickly as possible in order to ensure that optimum properties are obtained. In addition, the residence time in the mold determines the injection cycle, the length of which is one of the determining factors of the economy of the process. Even at high mold temperatures, these cycles are too long and, for this reason, are an obstacle to the acceptance of polyethylene terephthalate for use in the production of shaped articles by injection molding.

In addition, it has long been a considerable desire of polyester manufacturers to offer other polyalkylene terephthalates with an increased crystallization speed and greater crystallinity.

SUMMARY OF THE INVENTION

It has now suprisingly been found that polyalkylene terephthalates have a higher crystallization speed and a higher crystallization rate when they contain from about 0.5% to 30% by weight of sulphonic acid esters.

This invention shows how to attain the degree of crystallinity required for high dimensional stability more quickly and hence to process the polyester compositions with considerably shortened injection cycles. Also the moulding temperature is reduced without any adverse effect upon the favorable crystallization behavior. In this way, the injection molding composition cools down more quickly so that its residence time in the mold is additionally shortened.

Accordingly, the present invention provides highly crystalline, rapidly crystallizing thermoplastic compositions comprising:

(a) from about 70% to 99.5% by weight and preferably from about 85% to 99.5% by weight of a high molecular weight polyalkylene terephthalate with an intrinsic viscosity of at least about 0.6 dl/g, preferably at least about 0.8 dl/g (as measured on a 0.5% by weight solution in a mixture of phenol and tetrachloroethane in a ratio by weight of 1:1 at a temperature of 25° C.); and (b) from about 0.5% to 30% by weight and preferably about 0.5% to 15% by weight of a sulphonic acid ester which may be obtained by reacting (1) an alkyl sulphochloride corresponding to the formula:

$$R^1 - CH_2 - (CHR^2)_n - CH_2R_3$$

in which $R^1$, $R^2$ and $R^3$ independently represent H, Cl, $SO_2Cl$ and n represents an integer of from 3 to 33, preferably from 10 to 16, and the molar ratio of C to $SO_2Cl$ amounts to 35 to 1.25, with (2) an equivalent quantity of a compound corresponding to the formula (I):

$$HO-R^4(-\overset{O}{\underset{\|}{C}}-O)_m-R^5 \qquad (I)$$

in which $R^4$ represents a divalent aromatic radical, preferably a phenylene radical, with 6 to 14 carbon atoms, $R^5$ represents an alkyl, cycloalkyl or aryl radical containing 1 to 20 carbon atoms and m= 0 or 1, or a compound corresponding to the formula (II)

$$HO-\left[\underset{R^8}{\overset{R^6}{\bigcirc}}-X-\underset{R^9}{\overset{R^7}{\bigcirc}}\right]_p-OH \qquad (II)$$

in which $R^6$, $R^7$, $R^8$ and $R^9$ which may be the same or different represent a hydrogen atom, an alkyl radical with 1 to 4 carbon atoms, a chlorine or bromine atom, and X represents a direct bond, an alkylene or alkylidene radical with 1 to 8 carbon atoms, a cycloalkylene or cycloalkylidene radical with 5 to 15 carbon atoms, S, S, SO$_2$, O or
$\overset{\text{S}}{\underset{\text{O}}{\|}}$

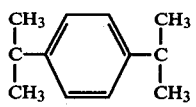

and P is 0 or 1

The present invention also provides a process for producing highly crystalline, rapidly crystallizing thermoplastic compositions, wherein from about 70% to 99.5% by weight and preferably from about 85% to 99.5% by weight of a high molecular weight polyalkylene terephthalate having an intrinsic viscosity of at least about 0.6 dl/g, preferably at least about 0.8 dl/g (as measured on a 0.5% by weight solution in a mixture of phenol and tetrachloroethane in a ratio by weight of 1:1 at a temperature of 25° C.) and from about 0.5% to 30% by weight and preferably from about 0.5% to 15% by weight of a sulphonic acid ester obtainable in the manner described above are mixed and homogenized in the melt. The operation may be carried out for example in a mixing screw. The hardened melt may then be granulated.

The present invention also relates to the use of sulphonic acid esters obtainable in the manner described above for increasing the crystallization speed and rate of crystallization of polyalkylene terephthalates.

In this application, "obtainable" and "which may be claimed" by a certain process is understood to mean: a product obtained by this certain process and products with identical structure obtained by another process.

DETAILED DESCRIPTION OF THE INVENTION

The dicarboxylic acid component of the polyalkylene terephthalate consists of terephthalic acid of which up to about 10 mol %, based on the acid component, may be replaced by other aromatic dicarboxylic acids containing from 6 to 14 carbon atoms, by aliphatic dicarboxylic acids containing from 4 to 8 carbon atoms or by cycloaliphatic dicarboxylic acids containing from 8 to 12 carbon atoms. Examples of dicarboxylic acids such as these are phthalic acid, isophthalic acid, naphthalene-2,6-dicarboxylic acid, diphenyl-4,4'-dicarboxylic acid, adipic acid, sebacic acid, cyclohexane diacetic acid.

Up to about 10 mol % of the diol component of the polyalkylene terephthalate, which consists of ethylene glycol, 1,3-propane diol, 1,4-butane diol, 1,5-pentane diol, 1,6-hexane diol or cyclohexane-1,4-dimethanol, and preferably consists of ethylene glycol may be replaced by other aliphatic diols containing from 3 to 8 carbon atoms, cycloaliphatic diols containing from 6 to 15 carbon atoms or aromatic diols containing from 6 to 21 carbon atoms. Examples of suitable diols are 3-methyl-2,4-pentane diol, 2-methyl-1,4-pentane diol, 2,2,4-trimethyl-1,2-pentane diol, 2,2-diethyl-1,3-propane diol, 1,3-hexane diol, 1,4-di-(β-hydroxyethoxy)-benzene, 2,2-bis-(4-hydroxy-cyclohexyl)-propane, 2,4-dihydroxy-1,1,3,3-tetramethyl cyclobutane, 2,2-bis-(3-β-hydroxyethoxyphenyl)-propane, 2,2-bis-(4-hydroxypropoxyphenyl)-propane.

The polyalkylene terephthalates may, of course, be branched by trihydric or tetrahydric alcohols or by tribasic or tetrabasic acids, as described, for example, in German Offenlegungsschrift No. 1,900,270 (i.e. U.S. Pat. No. 3,692,744). Suitable branching agents are, for example, trimesic acid, pyromellitic acid, trimethylol propane and trimethylol ethane, pentaerythritol. It is advisable to use no more than about 1 mol %, based on the acid component, of the branching agent.

The polyalkylene terephthalates may be obtained in conventional manner by (a) esterifying or transesterifying terephthalic aicd and/or the corresponding dialkyl terephthalates, preferably the dimethyl ester, with from about 1.05 to 5.0 mols and preferably with from about 1.4 to 3.6 mols of the diols, based on 1 mol of dicarboxylic acid component, and optionally the branching agent in the presence of esterification and/or transesterification catalysts, and (b) polycondensing the resulting reaction products in the presence of polycondensation catalysts under reduced pressure (<, 1 Torr) at temperatures of from 200° C. to 320° C.

Both the first step (a) and also the second step (b) of the condensation process are carried out in the presence of catalysts of the type described, for example, by R. E. Wilfong in J. Polym. Sci. 54, 385 (1961). Some of these catalysts are more effective accelerators for the esterification reaction (a), some are more effective accelerators for the polycondensation reaction (b) while others are fairly active catalysts for both (c).

The catalysts which are suitable for accelerating the first step of the reaction (a) (Type (a)) include;

1. Lithium, sodium, potassium, calcium, strontium, boron as the metals or as oxides, hydrides, formates, acetates, alcoholates or glycolates thereof;
2. calcium and strontium chlorides and bromides;
3. tertiary amines;
4. calcium and strontium malonates, adipates, benzoates, etc.;
5. lithium salts of dithiocarbamic acids.

Catalysts suitable for catalyzing the polycondensation step (b) (Type (b)) are, for example 1. molybdenum, germanium, lead, tin, antimony as the metals or as oxides, hydrides, formates, alcoholates or glycolates thereof;
2. zinc and lead borates and perborates;
3. zinc, manganese (II), cobalt, magnesium, chromium, iron and cadmium succinates, butyrates, adipates or enolates of a diketone;
4. zinc chloride and bromide;
5. lanthanum dioxide and titanate;
6. neodymium chloride;
7. mixed salts of antimony, for example, potassium antimony tartrate and salts of antimonic acids, such as potassium pyroantimonate;
8. zinc or manganese salts of dithiocarbamic acids;
9. cobalt naphthenate;
10. titanium tetrafluoride or tetrachloride;
11. alkyl orthotitanates;
12. titanium tetrachloride-ether complexes;
13. quaternary ammonium salts which contain a titanium hexaalkoxy radical; titanium tetraalkoxides, alkali or alkaline earth metal compounds of aluminum, zirconium or titanium alkoxides;
14. organic quaternary ammonium, sulphonium, phosphonium and oxonium hydroxides and salts;
15. barium malonate, adipate, benzoate, etc.
16. lead, zinc, cadmium or manganese salts or the monoalkyl ester of a phenylene dicarboxylic acid;
17. antimony-catechol complex with an aminoalcohol or with an amine and an alcohol;

18. uranium, trioxide, tetrahalide, nitrate, sulphate, acetate.

Catalysts suitable for accelerating both reaction steps (c) (Type (c)) are, for example 1. barium, magnesium, zinc, cadmium, aluminum, manganese, cobalt as metals, oxides, hydrides, formates, alcoholates, glycolates, preferably acetates;
2. aluminum chloride and bromide;
3. zinc, manganese (II), cobalt, magnesium, chromium, iron and cadmium succinates, butyrates, adipates or enolates of a diketone.

The compounds most suitable for use as catalysts of type (a) are Ca, Zn, Mn-salts, especially in the form of acetates.

The most suitable catalysts of type (b) are the compounds of zinc, manganese, cobalt, antimony, germanium, titanium and tin such as, or example, zinc and manganese acetate, antimony trioxide, trichloride, triacetate, germanium dioxide and tetrachloride.

The most suitable catalysts of type (c) are, in particular titanium compounds, for example, tetraalkyl titanic acid esters with alkyl groups containing from 1 to 10 carbon atoms, such as tetraisopropyl titanate and tetrabutyl titanate.

The catalysts are used in quantities of from about 0.001 to 0.2% by weight, based on the dicarboxylic acid component.

Thereafter, inhibitors of the type described, for example, by H. Ludewig in Polyesterfasern, 2nd Edition, Akademie-Verlag, Berlin 1974, are added to inhibit the catalysts of type (a) after the first stage of the reaction and to increase the stability of the end product. Examples of such inhibitors are phosphoric acid, phosphorous acid and their aliphatic, aromatic or araliphatic esters, for example alkyl esters with 6 to 18 carbon atoms in the alcohol component, phenyl esters of which the phenyl radicals are optionally substituted by 1 to 3 substituents containing from 6 to 18 carbon atoms, such as trinonyl phenyl, dodecyl phenyl or triphenyl phosphate. These inhibitors are normally used in quantities of from about 0.01 to 0.6% by weight, based on the dicarboxylic acid component.

In order to obtain an even higher molecular weight, the polyalkylene terephthalates may be subjected to a solidphase polycondensation reaction. To this end, the granulate product is normally polycondensed in the solid phase in a stream of nitrogen or in vacuo under a pressure below 1 Torr and at a temperature of from about 60° C. to 6° C. below the melting point of the polymer.

Alkyl sulphochlorides preferably used for producing the sulphonic acid esters used in accordance with the present invention contain from 1 to 4 and preferably 1 or 2 —$SO_2$—Cl-groups statistically or uniformly distributed through the hydrocarbon chain. Phenols of formula I suitable for reaction with these alkyl sulphochlorides are, for example, phenyl, diphenyl and napthyl derivatives, or suitable bisphenols of formula II are, for example, hydroquinone, resorcinol, dihydroxy diphenyl,
bis-(hydroxyphenyl)-alkanes,
bis-(hydroxyphenyl)-cycloalkanes,
bis-(hydroxyphenyl)-sulphides,
bis-(hydroxyphenyl)-ethers,
bis-(hydroxyphenyl)-sulphoxides,
bis-(hydroxyphenyl)-sulphones,
α, α-bis-(hydroxyphenyl)-diisopropyl benzenes,
and their nuclear-alkylated and nuclear-halogenated compounds.

The sulphonic acid esters may be obtained by reacting alkyl sulphochlorides with phenols or phenol derivatives or with bisphenols in the presence of an acid-binding agent, generally, pyridine or sodium hydroxide (phenolate) (cf. German Patent Specifications No. 849,107 and No. 849,120). They generally have a molecular weight in the range from about 220 to 2000.

The alkyl sulphochlorides are usually made from a mixture of n-paraffins and consequently consist of a mixture of sulphochloride with a different alkyl chain length. A preferred mixture of n-paraffins for the production of alkyl sulphochlorides is a mixture containing about 90% by weight of paraffinic n-hydrocarbons having 14 to 17 carbon atoms, about 8% weight of paraffinic n-hydrocarbons having less than 14 carbon atoms and about 2% by weight of paraffinic n-hydrocarbons having more than 17 carbon atoms.

Examples of suitable sulphonic acid ester are ($C_{12}$-$C_{18}$)-alkyl sulphonic acid-p-phenyl ester (refractive index $n_D^{20}$ = 1.499; viscosity 90-120 cp), ($C_{12}$-$C_{18}$)-alkyl-di-(sulphonic acid-p-phenyl ester) (refractive index $n_D^{20}$ = 1.5205; viscosity 1276 cp) ($C_{12}$-$C_{18}$)-alkyl-sulphonic acid-p-phenyloctyl ester (refractive index $n_D^{20}$ = 1.4975; viscosity 1540 cp), ($C_{12}$-$C_{18}$) alkyl-sulphonic acid-p-hydroxy-benzoic acid isobutyl ester (refractive index $n_D^{20}$ = 1.497; viscosity 750 cp), 2,2-bis-(($C_{12}$-$C_{18}$)-alkyl sulphonic acid-4-phenyl ester)-propane (refractive index $n_D^{20}$ = 1.51; viscosity 5016 cp), 2,2,-bis-(($C_{12}$-$C_{18}$)-alkyl sulphonic acid-3, 5-dichloro-4-phenyl ester)-propane.

These compounds are viscous liquids. ($C_{12}$-$C_{18}$)-alkyl designates a mixture of alkyl-radicals having 12 to 18 carbon atoms. The relative amount of the different alkyls corresponds to a Gauss-distribution.

The mixture of polyester resin and sulphonic acid ester may be produced in standard mixing units, such as kneaders, single-screw and twin-screw extruders. For further processing, the mixture obtained may be granulated after the melt has hardened. In this case, too, a solid-phase post-condensation reaction may subsequently be carried out.

For protection against thermo-oxidative degradation, stabilizers may be added to the copolyesters in conventional quantities, preferably in quantities of from about 0.001% to 0.5% by weight, based on the unfilled and non-reinforced copolyester. Suitable stabilizers are, for example, phenols and phenol derivatives, preferably sterically hindered phenols which contain $C_{1-6}$-alkyl substituents in both the o-positions to the phenolic hydroxy group, amines, preferably secondary arylamines and their derivatives, phosphates and phosphites, preferably their aryl derivatives, guinones, copper salts or organic acids, addition compounds of copper (I) halides with phosphites, for example, 4,4'-bis-(2,6-di-tert.-butylphenol), 1,3,5-trimethyl-2,4,6-tris-(3,5-di-tert.-butyl-4-hydroxybenzyl)-benzene, 4,4'-butylidene-bis-(6-tert.-butyl-m-cresol), 3,5,-di-tert.-butyl-4-hydroxybenzyl phosphonic acid diethyl ester, N,N'-bis-(β-naphthyl)-p-phenylene diamine, N,N'-bis-(1-methylheptyl)-p-phenylene diamine, phenyl-β-naphthalamine, 4,4'-bis-(α,α-dimethyl-benzyl)-diphenylamine, 1,3,5-tris-(3,5-di-tert.-butyl-4-hydroxyhydrocinnamoyl)-hexahydro-s-triazine, hydroquinone, p-benzoquinone, toluhydroquinone, p-tert.-butyl pyrocatechol, 4-phenyl ester)-propane (refractive index $N_D^{20}$ = 1.51; viscosity 5016 cp), 2,2-bis-(($C_{12}$–$C_{18}$)-alkyl sulphonic acid-3, 5-dichloro-4- phenyl ester)-propane. chloranil, naphthoquinone, copper naphthenate, copper octoate, Cu(I)CI/triphenyl phosphate, Cu(I)CI/trimethyl phosphite, CU(I)CI/trischloroethyl phosphite, CU(I)CI/tripropyl phosphite, p-nitrosodimethyl aniline.

The polyester compositions according to the invention may be reinforced with reinforcing materials. Suitable reinforcing materials are metals, silicates, carbon, glass predominantly in the form of fibers, cloths or mats. Glass fibers are preferably used as the reinforcing material. In addition it is possible, if desired, to add inorganic or organic pigments, dyes, lubricants and release agents, such as zinc stearate, montan wax, UV-absorbers, etc., in the usual quantities.

In order to obtain flameproof products, flameproofing agents known per se, for example halogen-containing compounds, elemental phosphorus or phophorus compounds, phosphorus-nitrogen compounds, antimony trioxide or even mixtures of these substances, preferably antimony trioxide, decarbromobiphenyl ether and tetrabromobisphenol-A-polycarbonate, may be included in the compositions, in quantities of from about 2 to 20% by weight, based on the molding compositions.

The crystallization rate of the polyester injection molding compositions according to the present invention may be further increased by the addition of nucleating agents in an amount of from about 0.01 to 1% by weight, based on the unfilled and non-reinforced polyester. Suitable nucleating agents are the compounds known to the expert as described, for example, in Kunststoff-Handbuch, Vol. VIII, "Polyester", Carl Hanser Verlag, Munich, 1973, page 701. The polyester compositions according to the present invention are excellent starting materials for the production of shaped articles of all kinds by injection molding. The following experiments were made in a conventional injection molding device.

Table 1 shows the 'mold residence times' and total injection cycle times of some of the polyester resin compositions according to the invention based on PET and alkyl sulphonic acid phenyl ester (Examples 1 to 15) by comparison with unmodified polyethylene terephthalate.

"Mold residence time" is the time interval between removing the injection machine from the mold after it is filled and the opening of the mold, i.e. the time interval needed for cooling the shaped articles in the mold.

The molded article was a cog wheel of 40 mm diameter.

The figures in table 1 were arrived at by gradually lowering mold temperature and shortening "mold residence time" until the moldings became unsatisfactory.

Table 1

| Example No. | Alkyl sulphonic acid ester Type | Quantity (% by weight) | Barrel temp. (°C.) | Mold temp. (°C.) | Residence time in mold (s) | Total injection-molding cycle (s) |
|---|---|---|---|---|---|---|
| 1 | ($C_{12}$–$C_{18}$)-alkyl sulphonic acid-p-phenyl ester refractive index $n_D^{20}$ 1.497–1.499; viscosity 90–120 cp) | 3 | 260 | 125 | 4.0 | 13.5 |
| 2 | " | 5 | 260 | 110 | 2.5 | 12.0 |
| 3 | " | 10 | 260 | 80 | 0 | 9.5 |
| 4 | ($C_{12}$–$C_{18}$)-alkyl di(sulphonic acid-p-phenyl ester) refractive index $n_D^{20}$ | 3 | 260 | 130 | 10 | 19.5 |
| 5 | 1.5205; viscosity 1276 cp | 5 | 260 | 120 | 7 | 16.5 |
| 6 | " | 10 | 260 | 110 | 6 | 15.5 |
| 7 | ($C_{12}$–$C_{18}$)-alkyl sulphonic acid-p-phenyl octyl ester (refractive index $n_D^{20}$ 1.4975; viscosity 1540CP) | 3 | 260 | 125 | 5 | 14.5 |
| 8 | " | 1 5 | 260 | 110 | 0 | 9.5 |
| 9 | " | 10 | 260 | 80 | 0 | 9.5 |
| 10 | ($C_{12}$–$C_{18}$)-alkyl sulphonic acid-p-hydroxy benzoic acid isobutyl ester 1540cp) 1.497; viscosity 750 cp) | 3 index $n_D^{20}$ | 260 | 130 | 9 | 18.5 |
| 11 | " | 5 | 260 | 120 | 7 | 16.5 |
| 12 | " | 10 | 260 | 110 | 5 | 14.5 |
| 13 | 2,2-bis-(($C_{12}$–$C_{18}$)-alkyl sulphonic acid-4-phenyl ester)-propane | 3 | 260 | 130 | 10 | 19.5 |

Table 1-continued

| | Alkyl sulphonic acid ester | | Processing conditions | | | Total injection-molding cycle (s) |
|---|---|---|---|---|---|---|
| Example No. | Type | Quantity (% by weight) | Barrel temp. (°C.) | Mold temp. (°C.) | Residence time in mold (s) | |
| 14 | " | 5 | 260 | 125 | 8 | 17.5 |
| 15 | " | 10 | 260 | 120 | 5 | 14.5 |
| 16 | — | — | 270 | 140 | 30 | 39.5 |

Although the invention has been described in detail for the purpose of illustration, it is to be understood that such detail is solely for that purpose and that variations can be made therein by those skilled in the art without departing from the spirit and scope of the invention except as it may be limited by the claims.

What is claimed is:

1. Rapidly crystallizing thermoplastic compositions comprising
   (a) about 70 to 99.5% by weight of a high molecular weight polyalkylene terephthalate having an intrinsic viscosity of at least 0.6 dl/g (as measured on a 0.5% by weight solution in a mixture of phenol and tetrachloroethane in a ratio by weight of 1:1 at a temperature of 25° C.) and
   (b) about 0.5 to 30% by weight of a sulphonic acid ester obtainable by the reaction of
   (1) an alkyl sulphochloride corresponding to the formula

in which
   $R^1$, $R^2$ and $R^3$ represent H, Cl, $SO_2Cl$ and
   n represents integers from 3 to 33 and the molar ratio of C to $SO_2Cl$ is between about 35:1 and 1.25:1 with
   (2) equivalent quantities of a compound corresponding to the formula

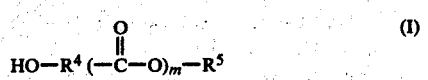

in which
   $R^4$ represents a difunctional aromatic radical containing from 6 to 14 carbon atoms,
   $R^5$ represents an alkyl, cycloalkyl or aryl radical containing from 1 to 20 carbon atoms and
   M = 0 or 1, or

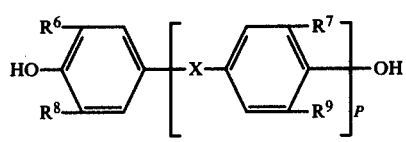

in which
   $R^6$, $R^7$, $R^8$ and $R^9$ are the same or different and represent a hydrogen atom, an alkyl radical containing from 1 to 4 carbon atoms, a chlorine or bromine atom, and
   x represents a single bond, an alkylene or alkylidene radical containing from 1 to 8 carbon atoms, a cycloalkylene or cycloalkylidene radical containing from 5 to 15 carbon atoms, S,

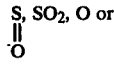

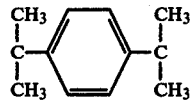

and P= 0 or 1.

2. A process for producing the compositions claimed in claim 1, wherein from about 70 to 99.5% by weight of a high molecular weight polyalkylene terephthalate having an intrinsic viscosity of at least 0.6 dl/g (as measured on a 0.5% by weight solution in a mixture of phenol and tetrachloroethane in a ratio by weight of 1:1 at a temperature of 25° C.) and about 0.5 to 30% by weight of a sulphonic acid ester described in claim 1 are mixed and homogenized in the melt.

3. A process for increasing the crystallization speed and the rate of crystallization of polyalkylene terephthalates comprising incorporating an effective amount of a sulphonic acid ester obtainable by the reaction of
   (1) an alkyl sulphochloride corresponding to the formula

in which
   $R^1$, $R^2$ and $R^3$ represent H, Cl, $SO_2Cl$ and
   n represents integers from represents hydrogen or 3 to 33 and the molar ratio of C to $SO_2Cl$ is between about 35:1 and 1.25:1,
   with
   (2) equivalent quantities of a compound corresponding to the formula

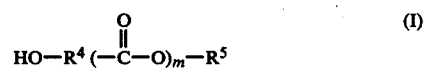

in which
   $R^4$ represents a difunctional aromatic radical containing from 6 to 14 carbon atoms,
   $R^5$ represents hydrogen or an alkyl, cycloalkyl or aryl radical containing from 1 to 20 carbon atoms and
   m = 0 or 1, or

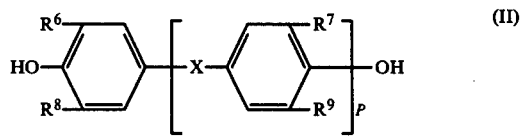

in which
   $R^6$, $R^7$, $R^8$ and $R^9$ are the same or different and represent a hydrogen atom, an alkyl radical containing from 1 to 4 carbon atoms, a chlorine or bromine atom, and X represents a single bond, an alkylene or alkylidene radical containing from 1 to 8 carbon atoms, a cycloalkylene or cycloalkylidene radical containing from 5 to 15 carbon atoms, S,

into said polyalklene terephthalates and p=0 or 1.

4. A rapidly crystallizing thermoplastic composition comprising (a) about 85 to 99.5 wt. % of a terephthalic acid copolyester having an intrinsic viscosity of at least about 0.6dl/g (as measured on a 0.5 wt. % solution in a 1:1 mixture of phenol and tetrachloroethane at 25° C.) which comprises (i) an acid component at least about 90 mol % of which is derived from terephthalic acid, and (ii) a diol component at least about 90 mol % of which is derived from ethylene glycol, and (b) about 0.5 to 15 % by weight of a sulphonic acid ester obtainable by the reaction product of (1) an alkyl sulphochloride corresponding to the formula R$^1$ 13 CH$_2$ — (CHR$^2$)$_n$ — CH$_2$ R$^3$ in which R$^1$, R$^2$ and R$^3$ represent H, Cl, SO$_2$Cl and n represents integers from 3 to 33 and the molar ratio of C to SO$_2$Cl is between about 35:1 and 1.25:1 with (2) equivalent quantities of a compound corresponding to the formula

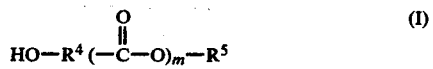

in which

R$^4$ represents a difunctional aromatic radical containing from 6 to 14 carbon atoms, R$^5$ represents hydrogen or an alkyl, cycloalkyl or aryl radical containing from 1 to 20 carbon atoms and m = 0 or 1, or

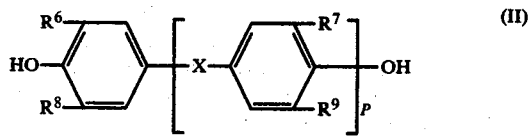

in which

R$^6$, R$^7$, R$^8$ and R$^9$ are the same or different and represent a hydrogen atom, an alkyl radical containing from 1 to 4 carbon atoms, a chlorine or bromine atom, and X represents a single bond, an alkylene or alkylidene radical containing from 1 to 8 carbon atoms, a cycloalkylene or cycloalkylidene radical containing from 5 to 15 carbon atoms, S.

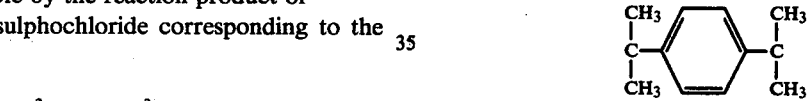

and P = O or 1.

5. The composition of claim 4 wherein (a) the polyester consists of polyethylene terephthalate, and (b) the alkyl sulphochloride used to produce the ester has 1 or 2 SO$_2$Cl groups.

6. The composition of claim 5 wherein the sulphonic acid residue has 12 to 18 carbon atoms.

* * * * *